US006447856B1

(12) United States Patent
Meagher et al.

(10) Patent No.: US 6,447,856 B1
(45) Date of Patent: Sep. 10, 2002

(54) HYDROTHERMAL GEL PROCESS FOR PREPARATION OF SILICALITE PARTICLES AND PROCESS FOR PREPARATION OF COMPOSITE MEMBRANE

(75) Inventors: Michael M. Meagher; Jicai Huang, both of Lincoln, NE (US)

(73) Assignee: The Board of Regents of The University of Nebraska, Lincoln, NE (US)

( * ) Notice: Subject to any disclaimer, the term of this patent is extended or adjusted under 35 U.S.C. 154(b) by 36 days.

(21) Appl. No.: 09/718,684

(22) Filed: Nov. 22, 2000

(51) Int. Cl.$^7$ ................................................. B06B 1/20

(52) U.S. Cl. .................... 427/601; 427/212; 427/213.3; 427/215; 427/600; 427/601

(58) Field of Search ............................. 427/212, 213.3, 427/213.31, 213.35, 215, 372.2, 430.1, 443.2, 600, 601; 502/60, 63, 64, 70; 423/700, 710; 264/442

(56) References Cited

U.S. PATENT DOCUMENTS

| 4,061,724 A | * 12/1977 | Grose et al. ................ 423/335 |
| 4,925,562 A | 5/1990 | te Hennepe et al. |
| 5,755,967 A | 5/1998 | Meagher et al. |

OTHER PUBLICATIONS

Bibby et al., Silicalite–2, a silica analogue of the aluminosilicalite zeolite ZSM–11, *Nature*, 1979, pp. 664–665, vol. 280.

Chen et al., Separation Properties of Alcohol–Water Mixture through Silicalite–1–Filled Silicone Rubber Membranes by Pervaporation, *J. Appl. Sci.*, 1998, pp. 629–636, vol. 67, John Wiley & Sons, Inc.

Dotremont et al., Sorption and diffusion of chlorinated hydrocarbons in silicalite–filled PDMS membranes, *J. Mem. Sci.*, 1995, pp. 109–117, vol. 104, Elsevier Science Publishers.

Duval et al., Adsorbent filled membranes for gas separation. Part 1. Improvement of the gas separation properties of polymeric membranes by incorporation of microporous adsorbents, *J. Mem. Sci.*, 1993, pp. 189–198, vol. 80, Elsevier Science Publishers.

Hennepe et al., Zeolite–Filled Silicone Rubber Membranes, *J. Membrane Science*, 1987, pp. 39–55, vol. 35, Elsevier Science Publishers.

Hennepe et al., Exclusion and Tortuosity Effects for Alcohol/Water Separation by Zeolite–Filled PDMS Membranes, *Sep. Science & Tech.*, 1991, pp. 585–596, vol. 26, No. 4.

Hennepe et al., Zeolite–filled silicone rubber membranes Experimental determination of concentration profiles, *J. Membrane Science*, 1994, pp. 185–196, vol. 89, Elsevier Science Publishers.

Jia et al., Preparation and characterization of thin–film zeolite–PDMS composite membranes*, *J. Mem. Sci.*, 1992, pp. 119–128, vol. 73, Elsevier Science Publishers.

Jonquieres et al., Filled and unfilled composite GFT PDMS membranes for the recovery of butanols from dilute aqueous solutions: influence of alcohol polarity, *J. Mem. Sci.*, 1997, pp. 245–255, vol. 125, Elsevier Science Publishers.

(List continued on next page.)

Primary Examiner—Shrive P. Beck
Assistant Examiner—Rebecca A. Blanton
(74) Attorney, Agent, or Firm—Senngier, Powers, Leavitt & Roedel

(57) ABSTRACT

A novel hydrothermal gel process for preparing silicalite particles suitable for use in composite membranes for pervaporation processes is disclosed. A novel process for preparing a silicon-silicalite composite membrane is also disclosed. The novel hydrothermal gel process produces silicalite particles having a diameter from about 0.1 micrometers to about 0.2 micrometers in high yield.

37 Claims, 10 Drawing Sheets

OTHER PUBLICATIONS

Li et al., Some Characteristics of Pervaporation for Dilute Ethanol–Water Mixtures by Alcohol–Permselective Composite Membrane, *Sep. Sci. & Tech.*, 1996, pp. 2867–2873, vol. 31, No. 20.

Moermans et al., Incorporation of Nano–Sized Zeolites in PDMS and PVA for the Manufacture of Thin Composite Membranes, *com 99 Program*, Jun. 12–18, 1999.

Persson et al., The synthesis of discrete colloidal particles of TPA–silicalite–1, *Zeolites*, 1994, pp. 557–567, vol. 14, No. 7, Butterworth–Heinemann.

Qureshi et al., Recovery of butanol from model solutions and fermentation broth using a silicalite/silicone membrane, *J. Mem. Sci.*, 1999, pp. 115–125, vol. 158, Elsevier Science Publishers.

Ravishankar et al., Physicochemical Characterization of Silicalite–1 Nanophase Material, *Phys. Chem.*, Apr. 1998, pp. 2633–2639, vol., 102, No. 9, American Chemical Society, USA.

Schoeman et al., Analysis of the crystal growth mechanism of TPA–silicate–1, *Zeolites*, 1994, pp. 568–575, vol. 14, No. 7, Butterworth–Heinemann.

* cited by examiner

HYDROTHERMAL GEL PROCESS FOR PREPARATION OF SILICALITE PARTICLES AND PROCESS FOR PREPARATION OF COMPOSITE MEMBRANE

BACKGROUND OF THE INVENTION

The present invention relates to a hydrothermal gel process for preparing ultrafine silicalite particles having a diameter from about 0.1 micrometers to about 0.5 micrometers. The present invention also relates to a process for preparing a thin-film silicalite-silicone composite membrane that can be utilized in a pervaporation process for recovery of volatile organic compounds such as butanol from aqueous solutions and fermentation broths wherein the composite membrane comprises silicalite particles having a diameter from about 0.1 micrometers to about 0.5 micrometers.

Recent concerns over polluting the environment and the limited supply of economically accessible crude oil have generated a renewed interest in replenishable energy supply technologies. Acetone butanol ethanol (ABE) fermentation is a biological process which produces a replenishable supply of organic fuels and solvents. The maximum concentration of total solvents (acetone, butanol, and ethanol) in an ABE fermentation broth is typically about 20 g/L. Recovery of these solvents in more concentrated form by simple distillation, however, is economically unfavorable as compared to the production of conventional petroleum based products.

One technique that has recently seen advances such that it may be economically possible to recover organics from fermentation broths is pervaporation. Pervaporation is a separation technique wherein liquid volatile organic compounds such as butanol are preferentially transported across a thin membrane film. The feed side of the membrane is contacted by an aqueous liquid or fermentation broth containing the volatile organic compound to be recovered, while a vacuum or sweep gas is applied on the permeate side of the membrane as a driving force to selectively transport components of the liquid or broth through the membrane. The volatile organic compounds are collected on the permeate side of the membrane by condensation in a cold trap. Two characteristics of the membrane utilized in a pervaporation process define the membrane's effectiveness in the separation of volatile organic compounds such as butanol in a pervaporation process: selectivity toward the desired species to be separated and flux or flow rate of the permeate through the membrane. Flux is generally defined as the rate at which permeate passes through the membrane and is generally reported in g/m$^2$h.

To date, several types of membranes have been utilized in pervaporation processes with varying degrees of success. These include silicone rubber type membranes, polypropylene membranes, polytetrafluoroethylene membranes, liquid membranes, and poly[1-(trimethylsilyl)-1-propyne] membranes and other modified polymer-type membranes. Although these membranes have suitable properties for recovering dilute alcohols from aqueous solutions or fermentation broths, their selectivities are typically too low for most commercial applications.

In an attempt to increase the selectivity and flux of silicone rubber-type membranes, which typically have the most advantageous properties for pervaporation as compared to other membranes, silicalite particles have been introduced as a filler into silicone type membranes to create composite membranes. Silicalite particles, which generally have a diameter from about 1 micrometer to about 45 micrometers, are hydrophobic and are capable of selectively adsorbing organic solvents such as alcohols and acetone from aqueous solutions or fermentation broths. Organics such as butanol are adsorbed into the silicalite particle rendering the membrane highly impermeable to water molecules which greatly increases selectivity for organic solvents. Composite type membranes utilizing silicalite particles have an increased selectivity and good flux rate as compared to previously utilized membranes.

In order to further improve the selectivity of silicone rubber-silicalite composite membranes while maintaining a sufficient flux rate, attempts have been made to synthesize silicalite particles having a diameter suitable for introduction into a silicone membrane. Utilizing a hydrothermal gel method of silicalite preparation, Meng-Dong Jia et al. (*Journal of Membrane Science*, 73 (1992) 119–128) purport to have produced silicalite particles having a diameter of 0.3 micrometers to 0.4 micrometers. However, the preparation methodology disclosed by Jia et al. does not produce silicalite particles having diameters within this range.

Ravishankar et al. (Physiochemical Characterization of Silicalite-1 Nanophase Material, *Journal of Physical Chemistry B*, 1998, 102 (2633–2639)), Schoeman, et al. (Analysis of the Crystal Growth Mechanism of TPA-Silicalite-1, *Zeolite*, 1994, Vol. 14, September/October pp. 568), and Persson et al. (The Synthesis of Discrete Colloid Particles of TPA-Silicalite-1, *Zeolite*, 1994 Vol 14, September/October pp. 557) have synthesized silicalite particulates in sizes ranging from about 0.02 micrometers to 0.1 micrometers in diameter utilizing a clear solution silicalite synthesis method. Although a clear solution method is capable of preparing nano-sized silicalite particulates, large scale commercial exploitation of clear solution methods is not cost effective as such methods can take several days to produce acceptable product. Apart from throughput limitations, such processes require the use of numerous expensive supercentrifugation separation steps and equipment capable of producing revolutions per minute in excess of 12,000 in order to separate the nano-sized silicalite particles from the solution. Also, nano-sized particles produced by clear solution processes tend to aggregate into larger particulates during separation, drying, and calcining making it difficult to disperse the particulates in a membrane cast solution and produce composite membranes incorporating nano-sized silicalite particles having a uniform active layer.

Therefore, a need persists for an economically practical process that can produce silicalite particles having a small diameter suitable for incorporation into a pervaporation membrane exhibiting high selectivity toward organic solvents. A need also continues to exist for thin film silicalite composite membranes having high flux rates toward organic compounds such as alcohols.

SUMMARY OF THE INVENTION

Among the objects of the present invention, therefore, are the provision of a process for producing silicalite particles having a diameter from about 0.1 to about 0.5 micrometers; the provision of a process for producing a silicalite-silicone composite membrane containing a filler material comprised of silicalite particles having a diameter from about 0.1 micrometer to about 0.5 micrometers; the provision of a process for producing a silicalite-silicone membrane having a uniform active layer comprising silicalite particles have a diameter from about 0.1 micrometer to about 0.2 micrometers; and the provision of a process for preparing a silicone composite membrane which can be utilized in a pervaporation process for recovering volatile organic compounds Briefly, therefore, the present invention is directed to a process for preparing silicalite particles. The process comprises mixing an alkylonium compound, a silica source, a base and water to form a gel which reacts to form silicalite particles having a diameter of from about 0.1 micrometers to about 0.5 micrometers. After the reaction, the silicalite particles are diluted with a liquid to form a liquid product mixture and the silicalite particles in the mixture are dispersed with ultrasonic waves. After the dispersion is complete, the silicalite particles are recovered from the liquid mixture and dried.

The invention is further directed to a process for preparing silicalite particles. The process comprises mixing an alkylonium compound, silica source, a base and water in a molar ratio of about 1:2–10:1–4:20–100, respectively, to form a gel. The gel is introduced into a sealed container and aged. After aging, the gel is heated to react the silica and alkylonium compound to form silicalite particles having a diameter of from about 0.1 micrometers to about 0.5 micrometers. Finally, the silicalite particles are recovered from the reaction mixture and dried.

The invention is further directed to a process for preparing silicalite particles. The process comprises mixing an alkylonium compound, silica source, a base and water in a molar ratio of about 1:2–10:1–4:20–100, respectively, to form a gel. The gel is introduced into a sealed container and aged. After aging, the gel is heated to react the silica and alkylonium compound to form silicalite particles having a diameter of from about 0.1 micrometers to about 0.5 micrometers. After the reaction, the silicalite particles are diluted with water to form a liquid product mixture and the silicalite particles in the mixture are dispersed with ultrasonic waves. Finally, the silicalite particles are recovered from the liquid product mixture and dried.

The invention is further directed to a process for preparing a thin-film silicalite-silicone composite membrane wherein the silicalite particles have a diameter of from about 0.1 micrometers to about 0.5 micrometers. The process comprises mixing silicalite particles, silicone rubber and iso-octane to form a membrane precursor mixture. After the precursor mixture is formed, ultrasonic waves are transmitted through the precursor to disperse the silicalite particles, silicone rubber and iso-octane. After dispersion of the precursor mixture, a silicone curing agent is introduced into the dispersed precursor mixture and the new mixture subjected to ultrasonic waves to disperse the curing agent. Finally, the mixture is pre-polymerized to increase the viscosity of the mixture and casted onto a support structure.

Other objects and features of this invention will be in part apparent and in part pointed out hereinafter.

BRIEF DESCRIPTION OF THE DRAWINGS

Corresponding reference characters indicate corresponding parts throughout the drawings.

DETAILED DESCRIPTION OF THE PREFERRED EMBODIMENTS

Figure 1:
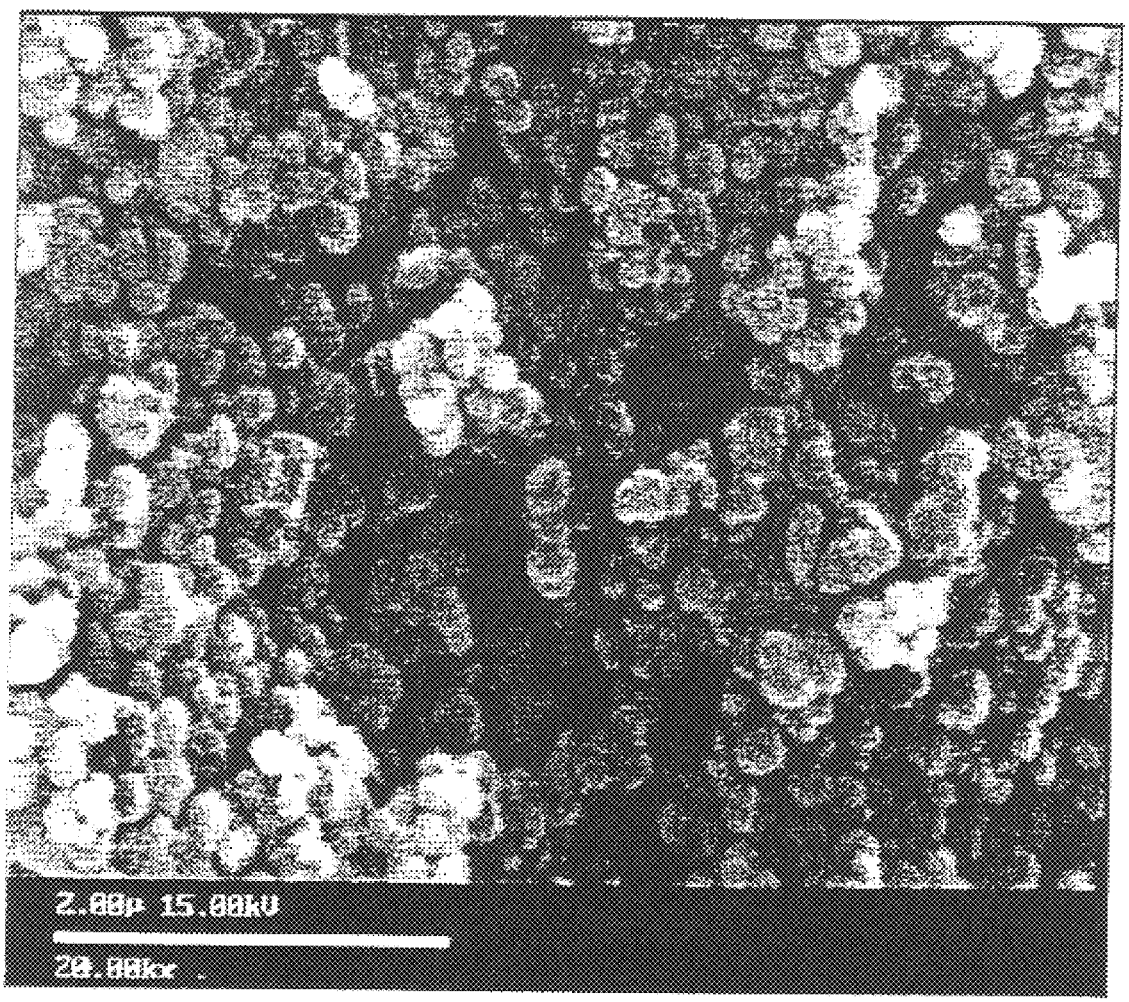
FIG. 1 is an SEM photograph of silicalite particles having a diameter of from about 0.1 micrometers to about 0.2 micrometers.

In accordance with the present invention, a hydrothermal gel process has been discovered that produces silicalite particles having a diameter from about 0.1 micrometers to about 0.5 micrometers in high yield. The particles may be incorporated into a silicalite-silicone composite membrane for use in a pervaporation process for the separation of volatile organic compounds from aqueous streams or fermentation broths. Silicone composite membranes incorporating silicalite particles having a diameter in this range have highly uniform active layers and exhibit substantially increased flux rates while maintaining high selectivities for organic compounds in a pervaporation process. In one embodiment of the present invention, the hydrothermal gel process can be controlled such that a significant portion of the resulting silicalite particles have a diameter from about 0.1 micrometers to about 0.2 micrometers.

Silicalite particles may be produced in accordance with the hydrothermal gel process of the present invention such that a predominant number of the particles produced have a diameter of from about 0.1 micrometers to about 0.5 micrometers, preferably from about 0.1 micrometers to about 0.2 micrometers. It has been discovered that several process parameters in the hydrothermal gel process significantly influence the diameter of the synthesized silicalite particles including the temperature at which the synthesis of the particles is carried out, the ratio of the reactants utilized in the synthesis and the reaction time. As described in detail below, these variables can be manipulated to influence the size and yield of the resulting silicalite particles. In another important aspect of the invention, it has been discovered that recovery of silicalite particles having the desired particle size can be significantly enhanced by subjecting the silicalite particles to ultrasonic waves at certain times during the process.

Silicalite particles are believed to be microporous polymorphs of silicon dioxide with MFI framework topology. The preparation of silicalite particles utilizing a hydrothermal gel process involves the hydrothermal crystallization of a reaction mixture maintained at a pH of from about 9 to about 14. The reactants form a hydrous crystalline precursor that may be subsequently calcined to decompose alkylonium moieties present therein. The reactants for the synthesis of the silicalite particles include an alkylonium compound and a silica source which are combined in the presence of water, preferably deionized water. A base is also added to the mixture to adjust the pH of the mixture within the above range. The silica source in the reaction mixture can be wholly or in part an alkali metal silicate or solid reactive amorphous silica such as fumed silica, silica sols or silica gel.

The alkylonium compound utilized is preferably highly soluble in the reaction mixture and can be generally expressed by the formula:

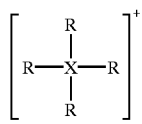

wherein R is an alkyl radical containing from 2 to 6 carbon atoms and X represents either phosphorus or nitrogen. Preferably, R is ethyl, propyl or n-butyl, especially propyl, and X is nitrogen. Suitable alkylonium compounds which may be utilized in the practice of the present invention are tetraethylammonium hydroxide, tetrapropylammonium hydroxide, tetrabutylammonium hydroxide, tetrabutylphosphonium hydroxide and the salts of the aforesaid hydroxides, particularly the chloride, iodide and bromide salts, for example, tetrapropylammonium bromide.

A gel is formed by thoroughly mixing an alkylonium compound, a silica source, a base and water in a non-reactive vessel such as a beaker comprised of, for example, teflon or another substantially inert material. It has been discovered that resulting silicalite particle size can be closely controlled and manipulated by varying the reactant ratio used to make the silicalite particles. In particular, a molar ratio of 1:2–10:1–4:20–100 (alkylonium compound:silica source:base:water), preferably 1:4:1.2–1.5:40, can be used to produce silicalite particles having a diameter of from about 0.1 micrometers and about 0.5 micrometers, preferably from about 0.1 micrometers to about 0.2 micrometers. The alkylonium compound and base are first dissolved in the water and then mixed with the silica source in the non-reactive vessel. The base is utilized to control the pH of the reaction mixture from about 9 to about 14. The base may be ammonium hydroxide or an alkali metal hydroxide, particularly lithium hydroxide, potassium hydroxide and sodium hydroxide, with sodium hydroxide being most preferred. Depending upon which alkylonium compound is utilized, varying amounts of base are required to maintain the pH of the reaction mixture in the desired range. If, for example, a hydroxide-containing alkylonium compound is utilized, typically less base will be required as the hydroxide will lower the pH of the reaction mixture.

The vessel containing the gel is then introduced into a sealed container such as a stainless steel pressure bomb or other suitable pressure vessel. Preferably, the gel is aged in the pressure vessel and develops autogenous pressure at room temperature for from about 1 hour to about 20 hours, more preferably for about 5 hours to about 15 hours, and most preferably from about 8 hours to about 10 hours.

After aging, the gel is heated to a preferred temperature of from about 80° C. to about 180° C., preferably to about 100° C. to increase the rate of reaction of the alkylonium compound and silica source to form crystals of the silicalite precursor. Although higher temperatures may significantly increase the rate of reaction, it is believed that as the temperature of the gel is increased, the particles size of the resulting silicalite product also increases. The inventors have found that it is preferable to maintain the gel at the lower end of the preferred temperature range during the reaction period to facilitate a high yield of silicalite particles having a diameter of from about 0.1 micrometers to about 0.5 micrometers, preferably from about 0.1 micrometers to about 0.2 micrometers.

The reaction in the heated gel is allowed to proceed under autogenous pressure for a period from about 12 hours to about 72 hours, preferably for about 48 hours to form a reaction mixture. During the reaction period, pressure builds in the pressure vessel and may increase from 0 kPa at the start of the reaction up to about 210 kPa or more.

After the reaction period is complete, silicalite particles are recovered from the reaction mixture. The reaction mixture is first cooled to room temperature and a diluting liquid such as deionized water may be added to the reaction mixture to form a liquid product mixture. The dilution of the reaction mixture aids in subsequent recovery of the silicalite particles by filtration or other recovery methods. The liquid product mixture may be transferred to a clean container such as a polyethylene or polypropylene plastic bottle, or a glass beaker.

In conventional hydrothermal gel processing, silicalite particles may become agglomerated during the synthesis process resulting in the formation of larger diameter particles having less desirable characteristics, particularly for use in the manufacture of silicalite composite membranes. In accordance with a preferred embodiment of the present invention, the detrimental effects of agglomeration on the particle size of the recovered silicalite product are minimized by subjecting the liquid product mixture to ultrasonic waves. The container of liquid product mixture is placed in an ultrasonic dispersion machine, such as a Branson Model 1510 (Branson Ultrasonic Corp., U.S.A.). In a typical setup, the ultrasonic dispersion machine includes a water bath and an ultrasonic wave generator. The water bath contained in the ultrasonic apparatus may be heated or may operate at room temperature. The container of liquid product mixture is placed in the water bath and the machine activated such that the ultrasonic waves are transmitted through the water bath and into the liquid product mixture. The frequency of the ultrasonic waves transmitted through the liquid product mixture is suitably from about 40 kHz to about 45 kHz, preferably about 42 kHz. The ultrasonic waves transmitted through the liquid product mixture separate and disperse silicalite particles in the liquid product mixture that may become agglomerated during particulate synthesis so that they may be recovered as particles having the desired size distribution. Preferably, the ultrasonic waves are transmitted through the liquid product mixture for a period from about 2 hours to about 48 hours, more preferably from about 4 hours to about 12 hours.

After the liquid product mixture has been subjected to the ultrasonic waves to substantially decrease or eliminate agglomeration, the silicalite particles are recovered from the liquid product mixture. Conventional particle separation techniques may be utilized to recover the silicalite particles. One such technique includes passing the liquid product mixture through a pressurized glass filter to separate any substantially larger particles which may exist and to produce a liquid product containing the silicalite product. This liquid product may then be subjected to centrifugation to recover the particles. In a typical centrifugation, the filtrate solution is subjected to from about 4000 g RCF to about 11,300 g RCF for about 20 minutes.

Once the silicalite product has been separated from the liquid product mixture, it is typically washed with deionized water several times until the pH of the drained wash solution is about 7. Water washing neutralizes and removes any unreacted base, such as sodium hydroxide, which may still be present in the silicalite product. The washed silicalite product is then dried. Drying may be carried by heating the particles to a temperature of from about 90° C. to about 110° C. for a period of from about 12 hours to about 24 hours. Optionally, the product may be dried under vacuum to facilitate quicker drying. The dried silicalite product may be calcined at a temperature of from about 550° C. to about 600° C. for a period of from about 5 hours to about 12 hours in, for example, an air purge furnace or similar conventional high temperature furnace.

The method as described above is useful in the preparation and recovery of silicalite particles having a diameter of from about 0.1 micrometers to about 0.5 micrometers, preferably from about 0.1 micrometers to about 0.2 micrometers. By following these procedures, a preponderance of the silicalite product has a diameter within these preferred ranges and are suitable for use in the preparation of a composite pervaporation membrane. However, it should be understood that the particle size distribution of the silicalite product may include particles having diameters greater than 0.5 micrometers and less than 0.1 micrometers.

In another embodiment of the present invention, a thin-film silicalite-silicone composite membrane for use in a pervaporation process is prepared. In an optional pre-treatment step prior to membrane preparation, agglomerated silicalite particles having an increased diameter, which may be created due to silanol condensation during the calcination of the silicalite particles, can be separated into particles having a diameter from about 0.1 micrometers to about 0.2 micrometers for use in preparation of the membrane. To reduce the number of silicalite particles having an undesirably large diameter, silicalite particles synthesized as described above may be mixed with deionized water and the mixture subjected to ultrasonic waves using an ultrasonic dispersion machine. The frequency of the ultrasonic waves transmitted through the aqueous mixture of silicalite particles is suitably from about 40 kHz to about 45 kHz, preferably about 42 kHz. Ultrasonic waves are typically transmitted through the silicalite/water mixture for a period of from about 4 hours to about 10 hours, more preferably for about 6 hours to form a colloid solution. The colloid solution is then preferably stilled (i.e., left undisturbed) to allow any larger agglomerated particles which may exist in the colloid solution to be precipitated to the bottom and discarded. The stilling may occur at room temperature for a period of from about 1 hour to about 10 hours, preferably from about 3 hours to about 4 hours. After stilling, the colloid solution is then filtered. The colloid solution may be filtered, for example, by passing the solution through a pressurized glass filter wherein the larger particles are precipitated at the bottom and separated out. After filtering, the liquid product is centrifuged. Typically, the liquid product may be centrifuged at from about 4000 g RCF to about 20,000 g RCF, preferably from about 8,000 g RCF to about 10,000 g RCF for a period of time from about 10 minutes to about 30 minutes, preferably about 20 minutes to separate the silicalite particles.

The recovered silicalite particles are then mixed with a solvent such as, for example, ethanol which significantly reduces or eliminates re-agglomeration into larger sized particulates during drying. The silicalite/ethanol mixture is then dried, for example by heating the mixture to a temperature of from about 40° C to about 100° C., preferably from about 60° C. to about 90° C., most preferably about 80° C. for a period from about 2 hours to about 20 hours, more preferably from about 5 hours to about 15 hours, most preferably for about 12 hours. The drying process is preferably conducted under a vacuum to facilitate evaporation of solvent absorbed on the silicalite particulates. The drying environment may be maintained at a pressure of from about 1 mmHg to about 200 mmHg, more preferably from about 10 mmHg to about 100 mmHg, and most preferably from about 20 mmHg to about 30 mmHg. After the above-described pre-treatment step, a preponderance of the silicalite particulates have a diameter of from about 0.1 micrometers to about 0.2 micrometers, and the particulates may be utilized in a membrane suitable for pervaporation processes.

To fabricate a thin film silicalite-silicone composite membrane in accordance with the present invention, the silicalite product, whether or not subjected to the above-described pre-treatment process, a silicone rubber, a solvent, and a silicone curing agent are utilized. The silicon rubber may be, for example, vinylmethylpolysiloxane or polydimethylsiloxane, the solvent may be iso-octane, and the curing agent may be, for example, polydimethyl hydrogen siloxane. A preferred weight ratio of these components is: 1 silicone rubber: 0.1–2.0 silicalite particulates: 0.1 curing agent: 2.0–10 iso-octane. A membrane precursor mixture containing the silicalite particulates, silicone rubber and iso-octane is formed in an inert vessel with a cap, such as a teflon or glass screw-capped bottle. The order in which the components are added into the vessel is not critical. The membrane precursor mixture is subjected to ultrasonic waves for a time sufficient to create a homogenous suspension. Typically, ultrasonic waves are transmitted through the membrane precursor mixture for about 1 hour to about 24 hours, more preferably for about 4 hours to about 12 hours. Suitable frequencies for the ultrasonic waves transmitted through the membrane precursor mixture include the range from about 40 kHz to about 45 kHz, preferably about 42 kHz.

Once a homogenous suspension is created by the ultrasonic waves, the silicon curing agent is added to the membrane precursor mixture and the resulting mixture is again subjected to ultrasonic waves for a period of from about 0.5 hours to about 3 hours, preferably about 1 hour at room temperature to disperse the curing agent throughout the membrane precursor mixture. Suitable frequencies for the ultrasonic waves are as indicated above. After the curing agent has been dispersed, the membrane precursor mixture is pre-polymerized for a period of from about 0.5 hours to about 10 hours, preferably from about 1 hour to about 5 hours, most preferably from about 2 hours to about 3 hours at a temperature from about 30° C. to about 100° C., preferably about 60° C. Pre-polymerization, or partial curing, is conducted prior to the casting of the active layer on a support membrane and final curing of the mixture to increase the viscosity of the mixture which significantly reduces or eliminates silicalite particulate aggregation in subsequent processing steps.

A porous membrane comprised of, for example polyetherimide, polysulfone, polyvinylidene fluoride, polytetrafluoroethylene, or polypropylene is utilized as the support structure upon which the active layer containing the silicalite particles will be cast. The support membrane typically has a pore size of from about 0.5 nanometers to about 100 nanometers, preferably from about 10 nanometers to about 30 nanometers, and more preferably from about 18 to about 20 nanometers to allow sufficient fluid flow therethrough. The active layer of the composite membrane containing the silicalite particles is formed on the support membrane by casting (e.g., using a casting knife or other suitable means) a portion of the pre-polymerized membrane precursor mixture on the porous membrane at room temperature and allowing the iso-octane solvent in the suspension to partially evaporate in air for from about 20 minutes to about 40 minutes, most preferably for about 30 minutes. The thickness of the active layer may be controlled by manipulating the gap distance between the casting knife and the support structure.

After the partial evaporation of the iso-octane solvent is complete, curing is initiated for at least about 1 hour, more preferably at least about 3 hours, more preferably at least about 6 hours, and still more preferably at least about 12 hours at a temperature of at least about 40° C., more preferably at least about 60° C., and most preferably at least about 80° C. to ensure complete curing of the active layer on the porous membrane. After the curing is complete, the composite membrane is thoroughly washed with deionized water and cut to a suitable size for use in a pervaporation process.

Thin-film silicalite-silicone composite membranes prepared in accordance with the present invention typically have an active layer thickness of from about 10 micrometers to about 150 micrometers, preferably from about 20 micrometers to about 40 micrometers. Although active layers having a thickness greater than about 150 micrometers can be prepared with the present invention, they are less preferred. The active layer typically contains at least about 30% by weight silicalite, more preferably at least about 40% silicalite, more preferably at least about 50% silicalite, and most preferably from about 60% to about 70% silicalite. As further mentioned below, the silicalite content of the active layer of the composite membrane may effect the ultimate performance of the composite membrane in a pervaporation process. The content of the silicalite in the membrane may be calculated according to Equation 1:

$$\% \text{ Silicalite Content} = \text{Silicalite}(g)/[\text{Silicone compound}(g) + \text{Curing agent}(g)] \quad (1)$$

The amount of iso-octane utilized in the preparation of the silicone-silicalite composite membrane is not considered in the calculation of the silicalite content of the membrane as the iso-octane solvent is evaporated from the mixture during the drying and curing steps discussed above and therefore is not present in the final composite membrane.

Silicalite-silicone composite membranes fabricated in accordance with the present invention are useful in a pervaporation process when the feed solution is at room temperature, or is heated to up to about 80° C. The composite membranes can achieve substantial flux rates up to about 700 g/m²h or more depending upon pervaporation conditions while maintaining a high selectivity for butanol up to about 110. The flux and selectivity of the composite membranes fabricated in accordance with the present invention are further illustrated in FIGS. 2–8 as discussed below.

The present invention is illustrated by the following examples which are merely for the purpose of illustration and are not to be regarded as limiting the scope of the invention or manner in which it may be practiced.

EXAMPLE 1

In this Example, silicalite particles suitable for use in a thin film silicalite composite membrane were synthesized.

Tetraproplyammonium bromide (0.02 Moles), Silica (Areosil 130 from Degussa Corporation) (0.08 Moles), sodium hydroxide (0.03 Moles), and deionized water (0.8 Moles) were introduced into a teflon beaker and thoroughly mixed into a viscous gel. The beaker containing the gel was placed into a stainless steel pressure bomb and aged at room temperature for 10 hours. After aging, heat was applied to bring the reactants to a temperature of about 100° C. and the reaction was allowed to proceed for 48 hours under autogenous pressure. During the reaction period, pressure within the bomb increased to about 206 kPa.

Figure 2:
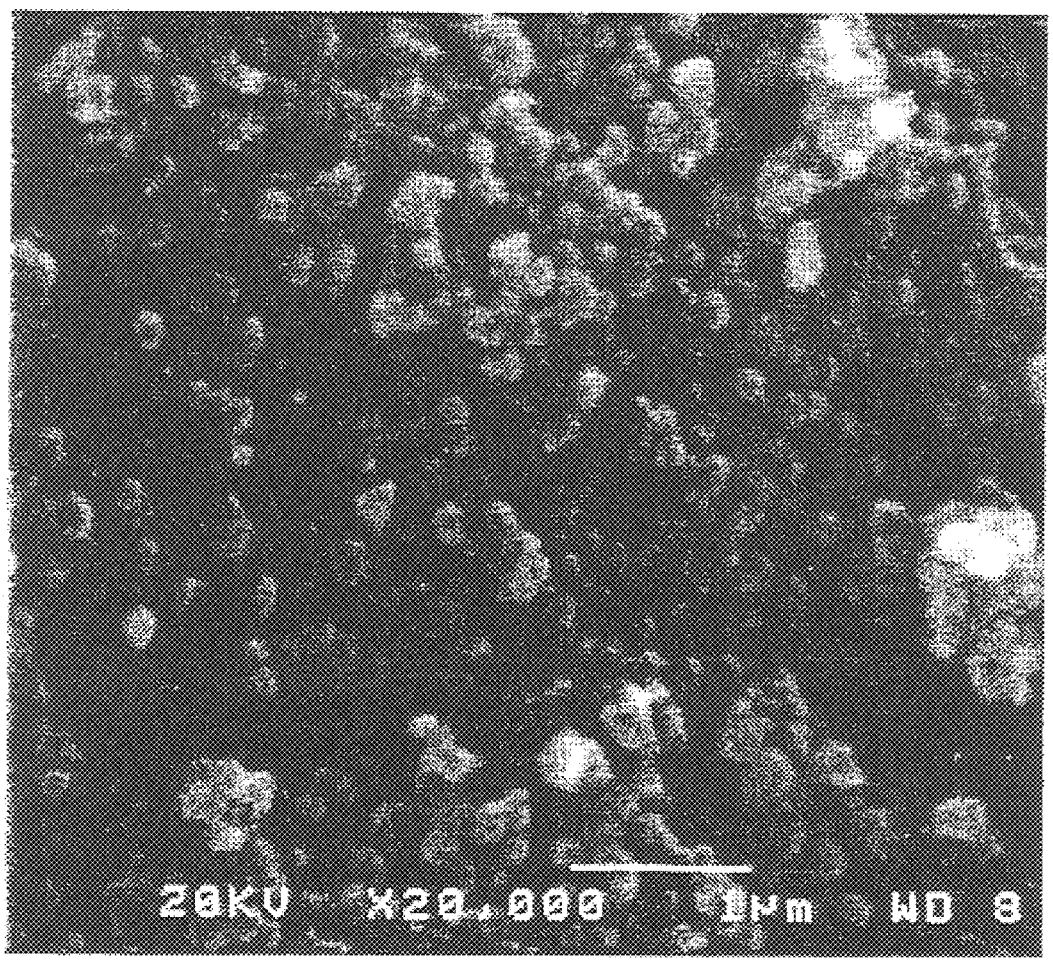
FIG. 2 is an SEM photograph of silicalite particles having a diameter of from about 0.1 micrometers to about 0.2 micrometers.

After the 48 hour reaction period, the reaction mixture was allowed to cool to room temperature and about 50–100 mL of deionized water was added. The liquid product mixture was subjected to ultrasonic waves for 2 hours to reduce the number of agglomerated particles. After the ultrasonic waves treatment, the solution was filtered through a glass filter. The liquid product filtrate was centrifuged at 11,300 g RCF for 20 minutes and the product collected. The collected product was then washed with deionized water until the pH of the wash solution was about 7. The washed silicalite particles were then dried at 103° C. for about 12 hours and finally calcined at 550° C. for about 12 hours in an air purge furnace. 3.64 grams of silicalite was recovered (72.8% yield) with a particle size of from about 0.1 micrometers to about 0.2 micrometers, as determined by SEM (JSM-6100 SEM instrument JEOL, Japan). FIGS. 1 and 2 show SEM photographs of the silicalite particles having a diameter of from about 0.1 to about 0.2 micrometers.

EXAMPLE 2

Using essentially the same procedure as set forth in Example 1, silicalite particles were synthesized in a reaction mixture comprising tetrapropylammonium bromide (0.02 Moles), silica (0.10 Moles), sodium hydroxide (0.03 Moles), and deionized water (0.8 Moles). 3.38 grams of silicalite was recovered (67.6% yield) with a particle size of 0.1 micrometers to about 0.2 micrometers, as determined by SEM (JSM-6100 SEM instrument JEOL, Japan).

EXAMPLE 3

Using essentially the same procedure as set forth in Example 1, silicalite particles were synthesized in a reaction mixture comprising tetrapropylammonium bromide (0.02 Moles), silica (0.08 Moles), sodium hydroxide (0.03 Moles), and deionized water (0.8 Moles). After aging, the temperature in the stainless steel pressure bomb was adjusted to 180° C. and the reaction allowed to proceed for 12 hours. 0.61 grams of silicalite was recovered (12.2% yield) with a particle size of 0.2 micrometers to about 0.5 micrometers, as determined by SEM (JSM-6100 SEM instrument JEOL, Japan).

EXAMPLE 4

In this Example, the silicalite particles synthesized in Example 1 were evaluated for solvent adsorption utilizing an acetone butanol ethanol fermentation model solution.

The silicalite particles (0.5 grams) were added to ABE fermentation model solution (10 grams) comprising 2.8 g/L acetone, 10.0 g/L butanol, 1.0 g/L ethanol, 1.0 g/L acetic acid and 1.0 g/L butyric acid and mixed for 30 minutes to create a suspension. The suspension was centrifuged in a micro centrifuge at 14,000 rpm for 5 minutes. The clear solution was removed and its composition was analyzed by gas chromatography. The adsorption capacity (mg/g) for the silicalite particles was found to be 97.1 (butanol), 7.0 (acetone), 0.26 (ethanol), 0 (acetic acid), and 6.62 (butyric acid).

EXAMPLE 5

Using essentially the same procedure as Example 4, silicalite particles (0.5 grams) synthesized in Example 2 were added to ABE fermentation model solution (10 grams) containing 2.8 g/L acetone, 10.0 g/L butanol, 1.0 g/L ethanol, 1.0 g/L acetic acid and 1.0 g/L butyric acid and mixed. The suspension was centrifuged and analyzed. The adsorption capacity (mg/g) for the silicalite particles was found to be 93.7 (butanol), 10.1 (acetone), 0 (ethanol), 1.08 (acetic acid), and 11.58 (butyric acid).

EXAMPLE 6

In this Example, a thin film silicalite-silicone composite membrane suitable for use in a pervaporation process was synthesized.

Silicalite particles prepared in Example 1 were mixed with deionized water (100mL) in a glass beaker and subjected to ultrasonic waves for a period of 4 hours to form a colloid solution which was subsequently stilled for about 2 hours. The stilled colloid solution was subsequently filtered through a glass filter and the filtrate centrifuged for 20 minutes at 11,300 g RCF. The liquid portion of the centrifuged material was discarded and ethanol (100 mL) was added to the solid particles to minimize re-aggregation of the particulates during the drying process. The collected particles were then dried at 80° C. under a vacuum (30 mmHg) for about 12 hours to produce silicalite particles having a diameter from about 0.1 micrometers to about 0.2 micrometers.

Silicalite particles as treated above (3.0 grams), vinylmethylpolysiloxane (VTR615A, General Electric)(2.0 grams) and iso-octane (8.0 grams) were mixed in a screw-capped glass bottle to form a membrane precursor mixture. Ultrasonic waves were transmitted through the membrane precursor mixture for 4 hours at room temperature to form a homogeneous suspension. After a homogeneous suspension was formed, VTR615B (silicone curing agent from General Electric)(0.2 grams) was added to the membrane precursor mixture and the mixture was again subjected to ultrasonic waves for 1 hour at room temperature. After the dispersion, the membrane precursor mixture was pre-polymerized at 60° C. for 3 hours.

On a porous polyetherimide membrane having a pore size of from about 18 nanometers to about 20 nanometers a thin active layer was formed by casting the pre-polymerized suspension onto the porous membrane using a casting knife. The casted layer on the support surface was allowed to air dry at room temperature for about 20 minutes and finally cured at 80° C. for about 12 hours to ensure complete reaction. After complete curing, the membrane was washed with deionized water and air dried. The composite membrane had an active layer about 19 micrometers thick.

EXAMPLE 7

In this Example, thin-film silicalite-silicone composite membranes prepared in accordance with the present invention incorporating varying amounts of silicalite particles were utilized in a pervaporation process and properties of the membranes were measured under different pervaporation conditions.

Figure 3:
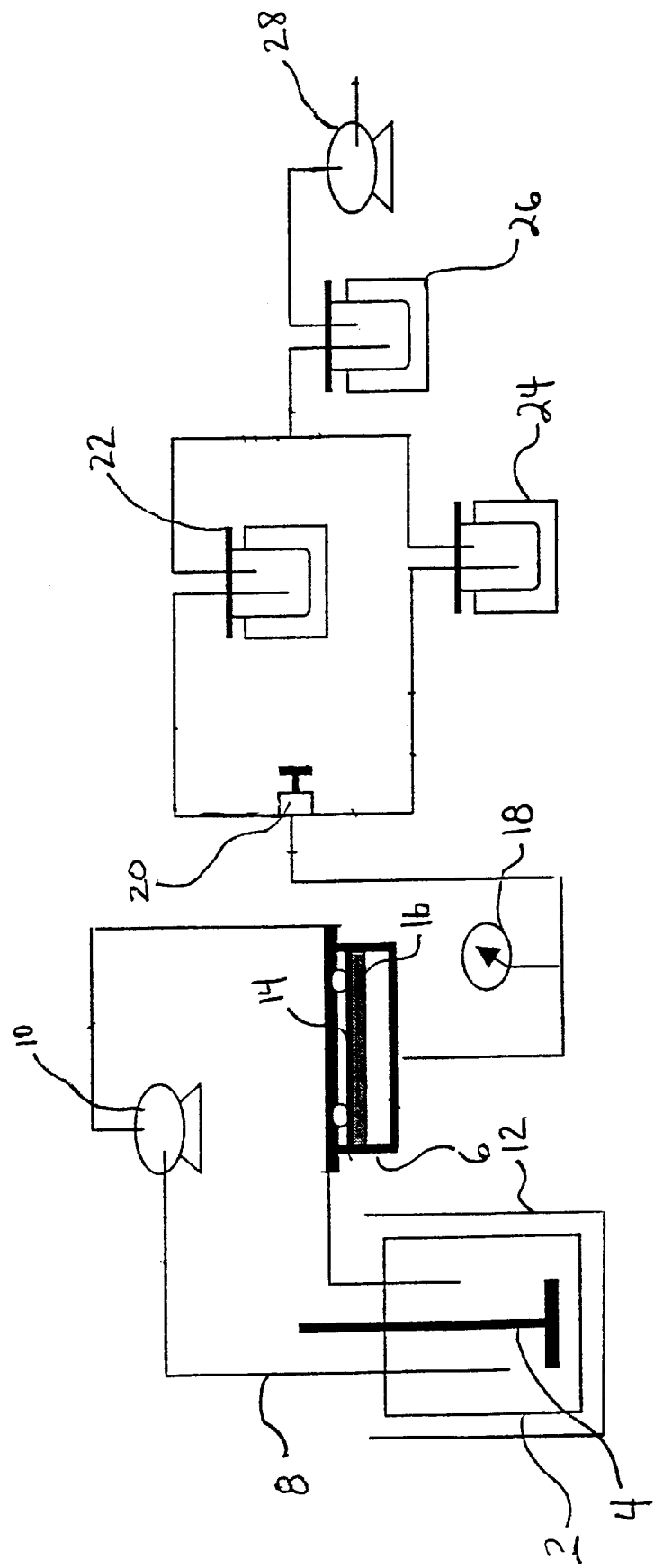
FIG. 3 is a schematic diagram of a pervaporation apparatus.

The pervaporation apparatus utilized in this Example is shown in FIG. 3. The apparatus includes an agitated feed tank 2 having a mixing arm 4. Liquid solutions are pumped from the feed tank to a membrane cell 6 through feed line 8 by pump 10. Thermostat bath 12 is capable of heating the feed solution to a desired temperature before it enters the membrane cell. The membrane cell contains the silicalite-silicone composite membrane which rests on porous support member 16. Vacuum gauge 18 allows monitoring of the pressure below the membrane and three way stop-cock 20 allows liquid to flow by permeate traps 22 and 24 and be collected. Vapor trap 26 protects vacuum pump 28 from being contaminated with vapors.

The silicalite particles utilized in each silicalite-silicone composite membrane prepared in accordance with the present invention had a diameter of from about 0.1 micrometers to about 0.2 micrometers and each membrane utilized had an active area of about 0.01 m$^2$. A feed solution comprising about 10 g/L butanol in water was circulated at about 1440 mL/minute across the membrane surface using a varistaltic pump. A temperature controlled water bath was utilized to control the temperature of the feed solution. The pressure on the feed side of the membrane was atmospheric and the pressure on the permeate side was held from about 0.5 to about 3.0 mm Hg. The permeate was collected in a the cold trap which was held at a temperature of about −78.5° C. The flux (J) and the selectivity (α) of each membrane was calculated according to equations (2) and (3):

$$J = W/At (g/m^2 h) \quad (2)$$

$$\alpha = [y/(1-y)]/[x/(1-x)] \quad (3)$$

where W refers to the weight of the permeate collected, A is the membrane area, and t is the time for sample collection, and x and y are weight fraction of the butanol components in the feed and permeate samples, respectively.

Figure 4:
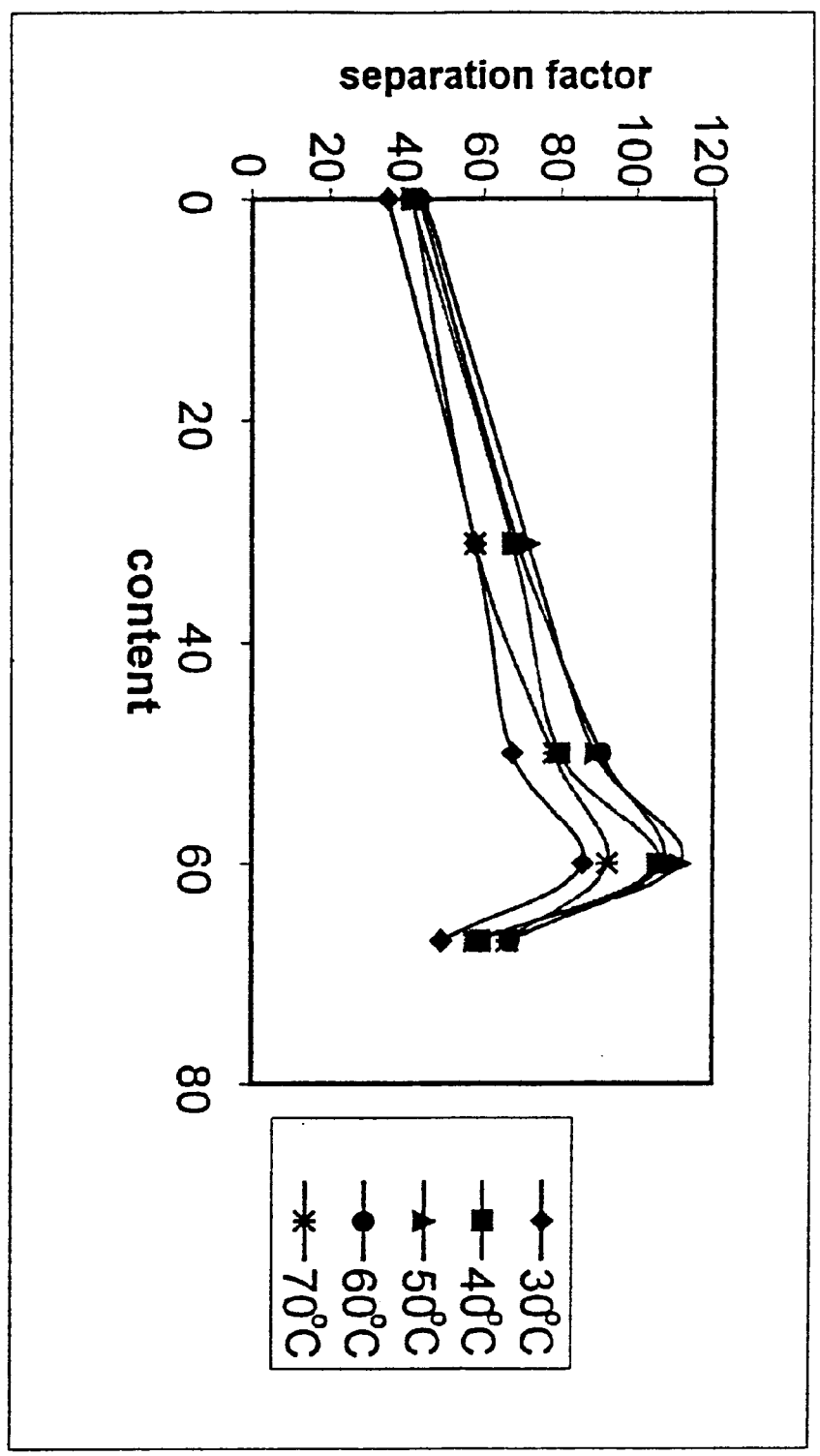
FIG. 4 is a graph illustrating the relationship of separation factor (butanol) and silicalite content (%) in a silicalite-silicone composite membrane at various temperatures.
Figure 5:
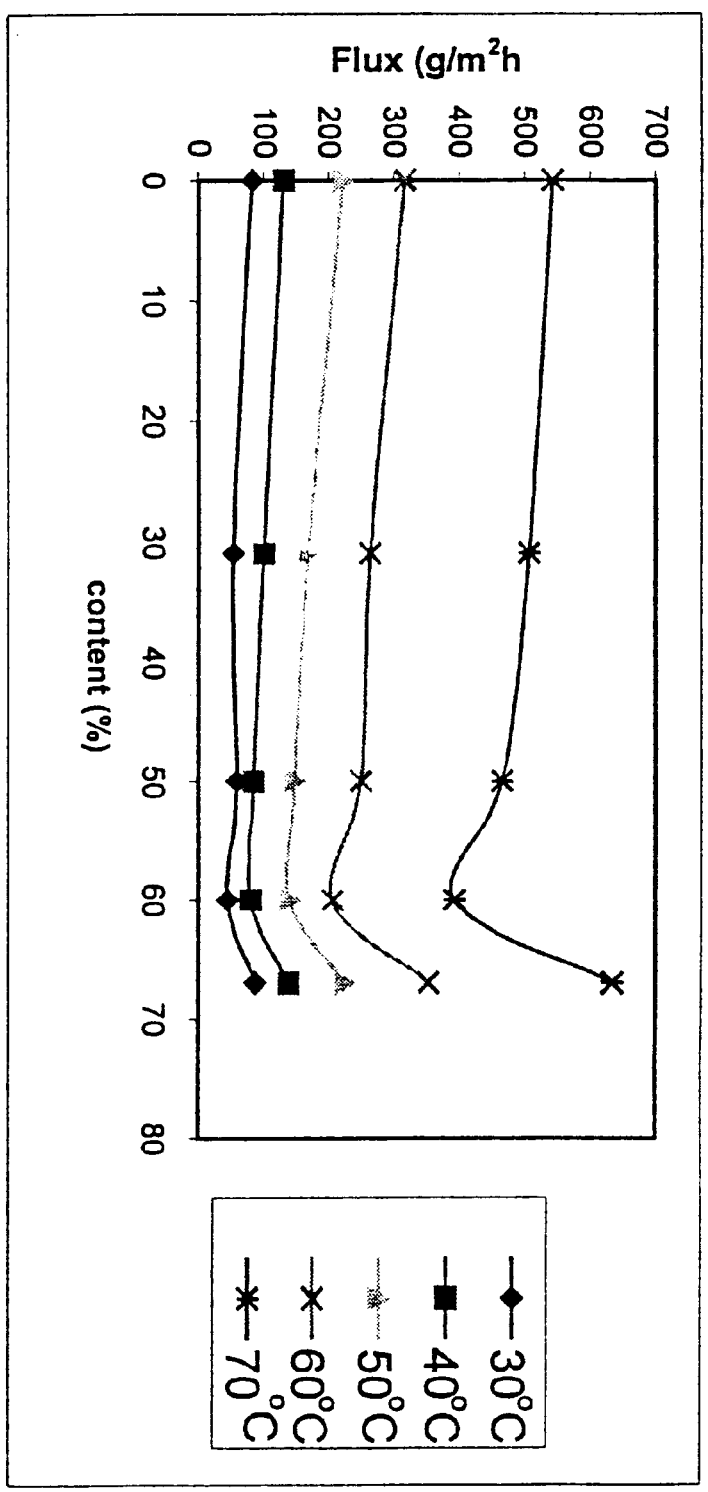
FIG. 5 is a graph illustrating the relationship of flux (butanol containing feed solution) and silicalite content (%) in a silicalite-silicone composite membrane at various temperatures.

FIG. 4 shows the relationship between the separation factor (butanol) and the content of silicalite (%) contained in a composite membrane at feed solution temperatures ranging from 30° C. to 70° C. Each membrane had an active layer thickness of from about 50 micrometers to about 70 micrometers. As FIG. 4 indicates, membrane selectivity increased with the increase of silicalite content in the active layer up to about 60%. Without being bound to a particular theory, it appears that the increase in selectivity is caused by the increase in both the butanol solubility and diffusive rate of butanol in the membrane as butanol diffuses through the silicalite particle at a higher rate than through silicone, while the water molecules follow a more complex path around the silicalite particle resulting in a low water flux. At about 70% silicalite content in the composite membrane, the selectivity decreased. This effect appears to be a direct result of the aggregation of silicalite particles in the active layer at such a high concentration which results in the formation of defects in the layer reducing selectivity.

FIG. 35 shows the relationship between the flux of the feed solution and the content of silicalite (%) contained in a composite membrane at temperatures ranging from 30° C. to 70° C. Each membrane had an active layer thickness of from about 50 micrometers to about 70 micrometers. As FIG. 5 indicates, the total membrane flux decreased slightly with the increase of silicalite content regardless of temperature. As stated above, as the silicalite content increases, it becomes more difficult for water molecules to move through the membrane and directly influences the flux rate. When the silicalite content reached more than 60%, as expected based on the selectivity values discussed above, a sharp increase in flux is seen as the silicalite particles begin to agglomerate causing the formation of defects in the active layer.

Figure 6:
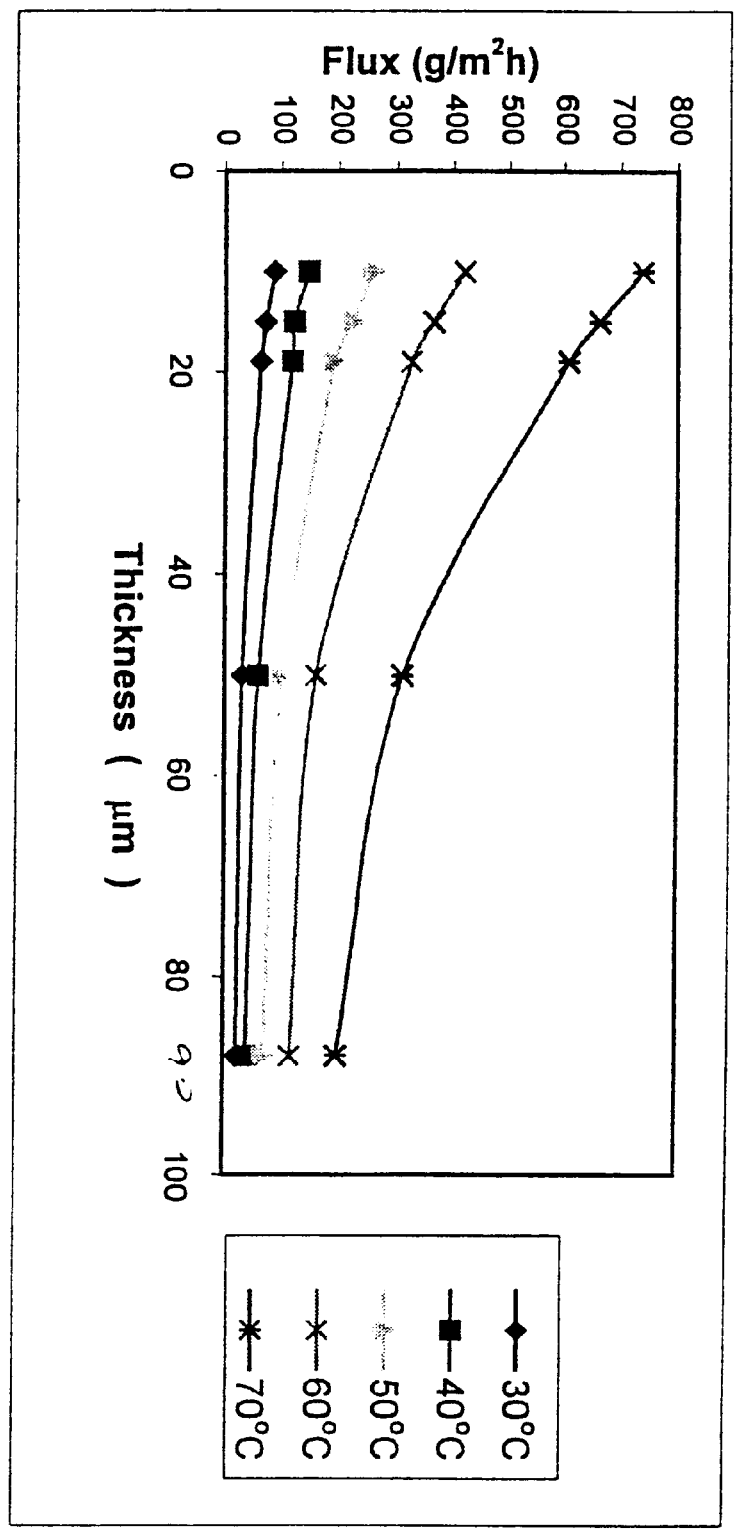
FIG. 6 is a graph illustrating the relationship of flux (butanol containing feed solution) and membrane active layer thickness at various temperatures.
Figure 7:
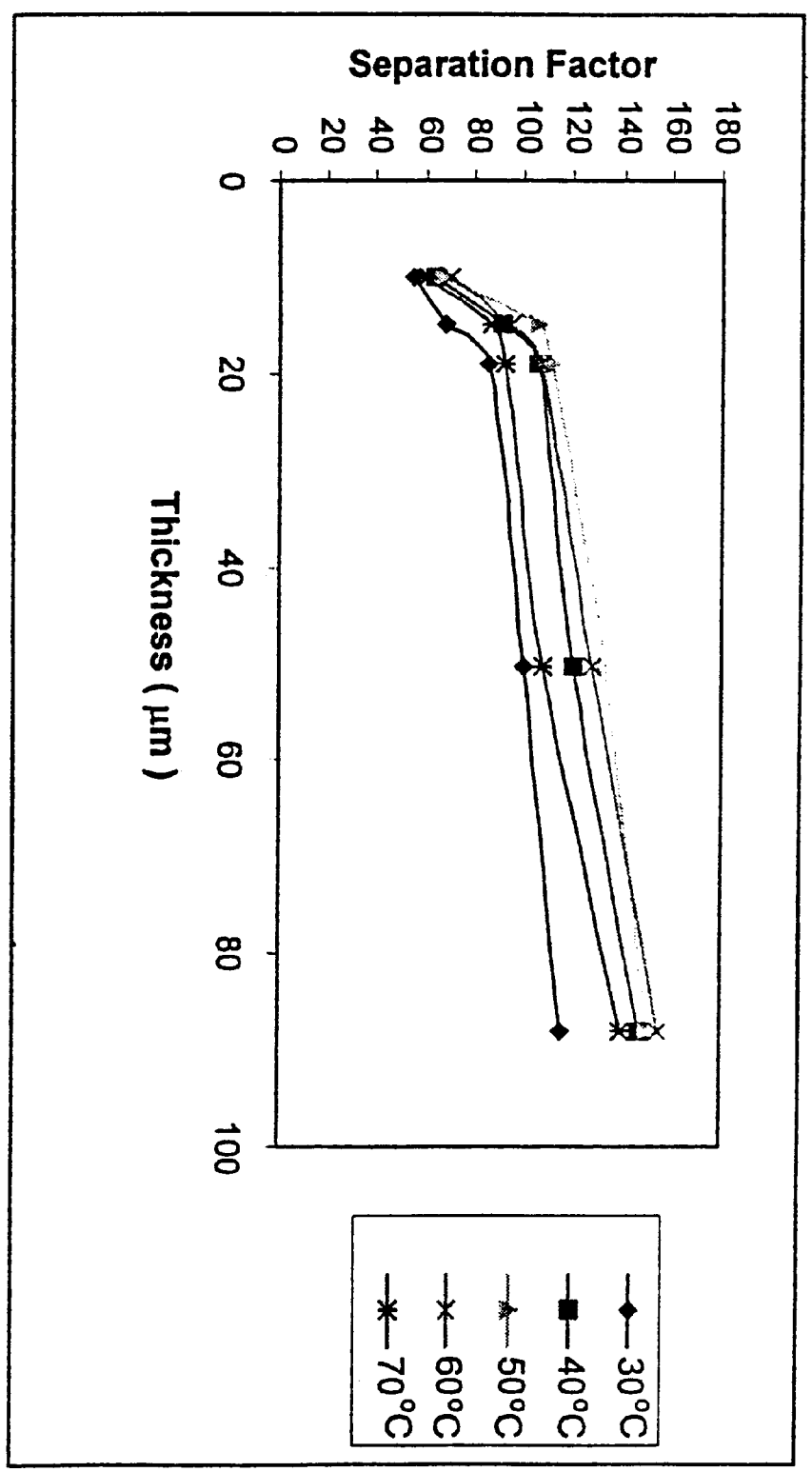
FIG. 7 is a graph illustrating the relationship of separation factor (butanol) and membrane active layer thickness at various temperatures.

FIGS. 6 and 7 show the relationship between the thickness of the active layer of the silicalite-silicone composite membrane and (1) flux of the feed solution and (2) selectivity of the membrane (butanol), respectively, at temperatures ranging from 30° C. to 70° C. utilizing a membrane having a silicalite content of about 60%. As FIG. 6 indicates, the membrane flux increased with the decrease of the active layer thickness, with a large increase in flux at 70° C. As FIG. 7 indicates, the membrane selectivity decreased slightly with the decrease of the active layer thickness until a thickness of about 20 micrometers, after which thinner active layers produced much lower selectivities. Both FIGS. 6 and 7 indicate that a composite membrane with a separation factor of 90–100 and a flux of 650–700 g/m²h at 70° C. and an active layer thickness of about 15 micrometers has been fabricated. This represents nearly a 7-fold improvement in flux while maintaining about the same selectivity as compared to conventional composite membranes utilizing silicalite particles.

Figure 8:
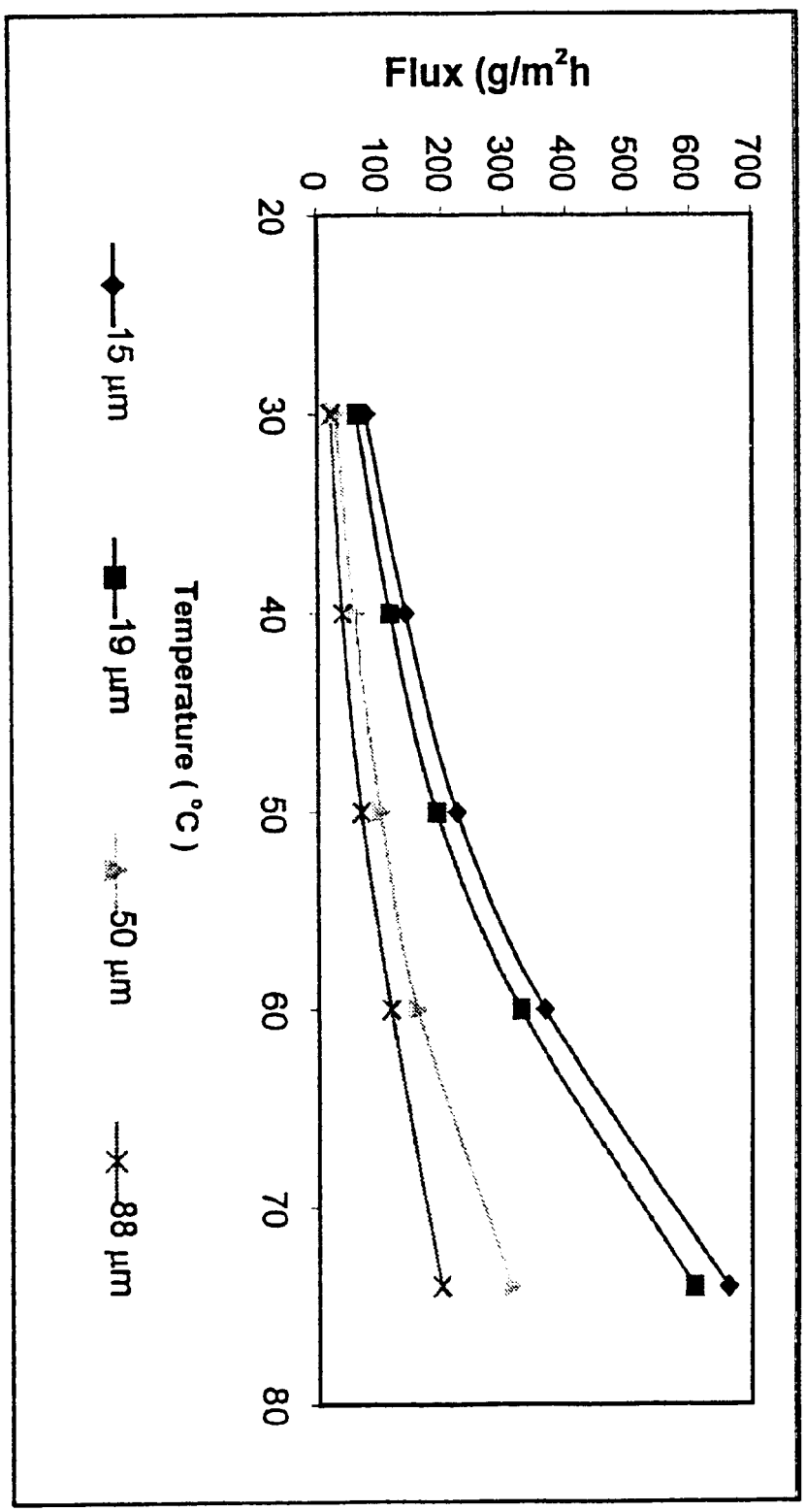
FIG. 8 is a graph illustrating the relationship of flux (butanol containing feed solution) and feed solution temperature for various membrane active layer thicknesses.
Figure 9:
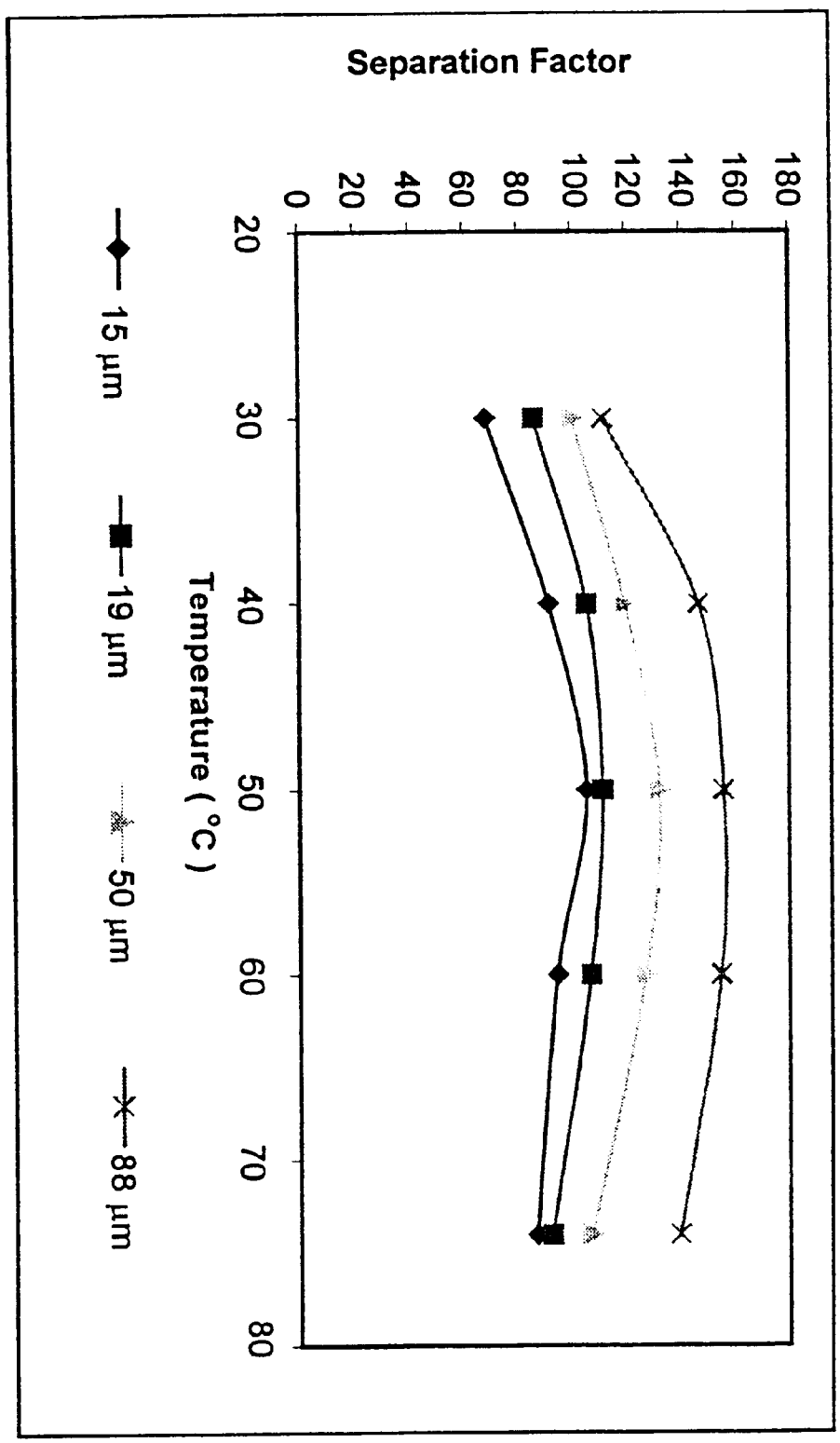
FIG. 9 is a graph illustrating the relationship of separation factor (butanol) and feed solution temperature for various membrane active layer thicknesses.

FIGS. 8 and 9 show the effect of the temperature of the feed solution on membrane properties such as flux and selectivity (butanol) for membranes having various active layer thicknesses and a silicalite concentration of 60%. As FIG. 8 indicates, membrane flux increased with the increased temperature. Without being bound to a particular theory, it appears that this increase is due to the increased solubility and diffusivity of butanol and water in the membrane and the increase of sorption and desorption rate of butanol in the silicalite particles. As FIG. 9 indicates, membrane selectivity increased with temperature up to about 50° C., which appears to be due to the increased rate of butanol desorption in the silicalite particles. At 70° C., the membrane selectivity continued to decrease, probably due to the increase in water diffusivity through the active layer at elevated temperatures.

Figure 10:
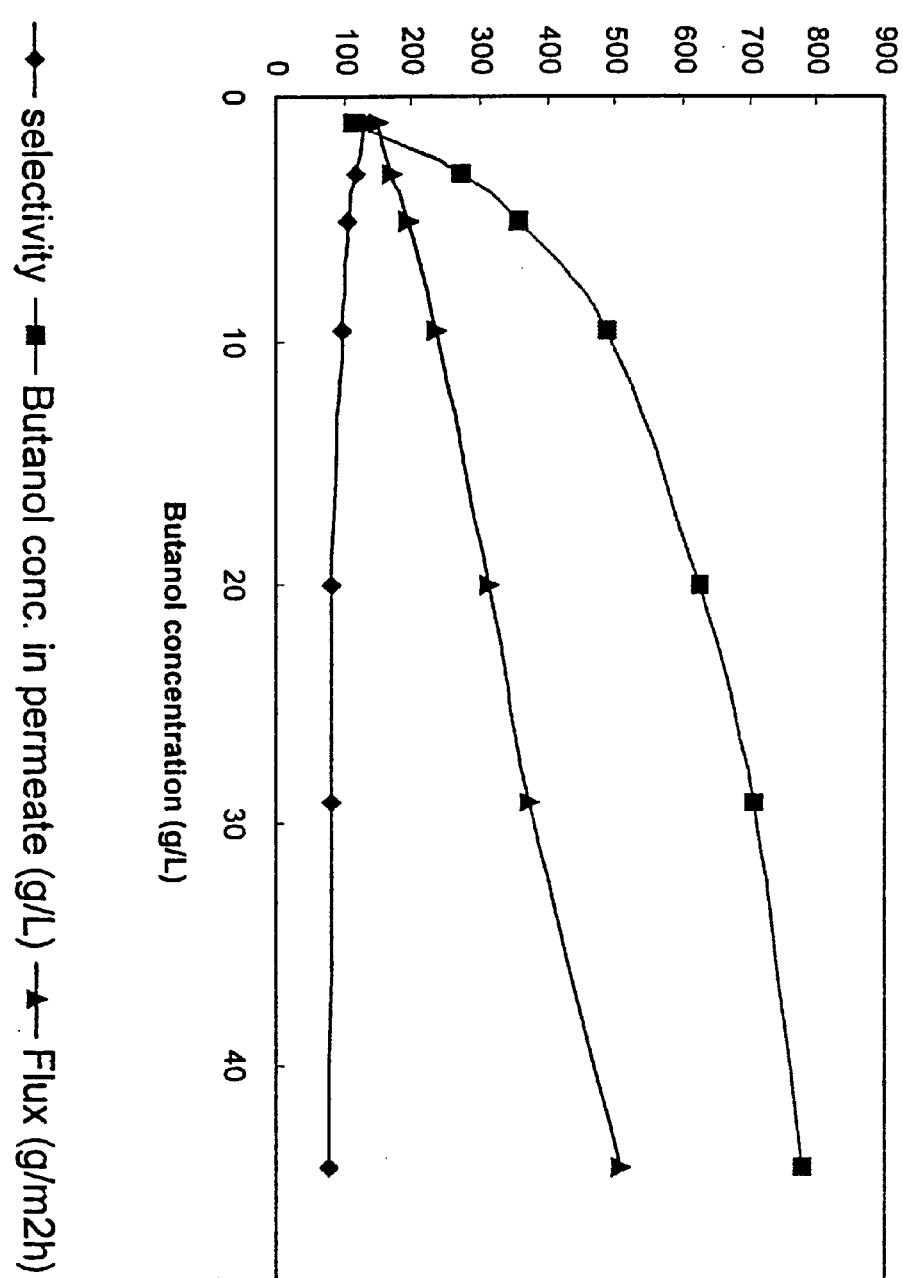
FIG. 10 is a graph illustrating the effect of butanol concentration in the feed solution on membrane flux, selectivity (butanol), and butanol concentration in collected permeate.

FIG. 10 shows the effect of butanol feed concentration on the performance of a silicalite-silicone composite membrane with a silicalite content of 60% and an active layer thickness of 50 micrometers at a feed solution temperature of 70° C. As FIG. 10 indicates, membrane flux increased linearly with the increase of feed butanol concentration in the range of from about 0.5 g/L to about 50 g/L. The permeate butanol concentration also increased with the increase of feed butanol concentration and reached about 770–800 g/L at a feed concentration of 45–50 g/L. The selectivity of the membrane decreased slightly with the increase of the feed butanol concentration.

In view of the above, it will be seen that the several objects of the invention are achieved. As various changes could be made in the above-described process for making silicalite particles and composite membranes without departing from the scope of the invention, it is intended that all matter contained in the above description be interpreted as illustrative and not in a limiting sense.

What is claimed is:

1. A process for preparing silicalite particles, the process comprising:
    mixing an alkylonium compound, silica source, a base and water to form a gel;
    heating the gel to form a reaction mixture comprising silicalite particles having a diameter from about 0.1 micrometers to about 0.5 micrometers;
    diluting the reaction mixture with a liquid to form a liquid product mixture;
    transmitting ultrasonic waves through the liquid product mixture to disperse the silicalite particles in the liquid product mixture;
    recovering the silicalite particles from the liquid product mixture; and
    drying the silicalite particles.

2. The process as set forth in claim 1 wherein the gel is heated to a temperature of from about 80° C. to about 180° C.

3. The process as set forth in claim 2 wherein the gel is heated for a reaction period of from about 12 hours to about 72 hours.

4. The process as set forth in claim 1 wherein the reaction mixture comprises silicalite particles having a diameter from about 0.1 micrometers to about 0.2 micrometers.

5. The process as set forth in claim 1 wherein the alkylonium compound and silica source are reacted for about 48 hours at a temperature of about 100° C.

6. The process as set forth in claim 1 wherein the recovery step comprises:
    filtering the liquid product mixture to separate silicalite particles from the liquid product mixture and produce a liquid product filtrate; and
    centrifuging the liquid product filtrate to separate silicalite particles from the liquid product filtrate.

7. The process as set forth in claim 1 wherein the silicalite particles are calcined after drying.

8. The process as set forth in claim 1 wherein the reaction mixture is diluted with deionized water.

9. The process as set forth in claim 1 wherein the alkyonium compound is tetrapropylammonium bromide and the base is sodium hydroxide.

10. The process as set forth in claim 1 wherein the gel is aged for a period of from about 5 to about 15 hours prior to heating.

11. The process as set forth in claim 1 wherein ultrasonic waves are transmitted through the liquid product mixture for a period of from about 2 hours to about 48 hours.

12. The process as set forth in claim 9 wherein ultrasonic waves are transmitted through the liquid product mixture for a period of from about 4 to about 12 hours.

13. The process as set forth in claim 1 wherein the ultrasonic waves are transmitted through the liquid product mixture at a frequency of about 42 kHz.

14. A process for preparing silicalite particles, the process comprising:
    mixing an alkylonium compound, silica source, a base and water in a molar ratio of about 1:2–10:1–4:20–100, respectively, to form a gel;
    aging the gel in a sealed container;
    heating the aged gel in the sealed container and reacting the alkylonium compound and silica in the gel to form a reaction mixture comprising silicalite particles having a diameter from about 0.1 micrometers to about 0.5 micrometers;
    recovering the silicalite particles from the reaction mixture; and
    drying the silicalite particles.

15. The process as set forth in claim 14 wherein the gel is aged for a period of from about 1 hour to about 20 hours.

16. The process as set forth in claim 15 wherein the gel is heated to a temperature of from about 80° C. to about 180° C.

17. The process as set forth in claim 16 wherein the gel is heated for a reaction period of from about 12 hours to about 72 hours.

18. The process as set forth in claim 14 wherein the reaction mixture comprises silicalite particles having a diameter of from about 0.1 to about 0.2 micrometers.

19. The process as set forth in claim 15 wherein the alkylonium compound, silica source, base and water are mixed in a molar ratio of about 1.0:4.0:1.2–1.5:40, respectively.

20. The process as set forth in claim 15 wherein the gel is aged for a period of from about 5 to about 15 hours.

21. The process as set forth in claim 15 wherein the alkylonium compound and silica source in the heated gel are reacted for about 48 hours at a temperature of about 100° C.

22. The process as set forth in claim 15 wherein the recovery step comprises:

filtering the reaction mixture to separate silicalite particles from the reaction mixture and produce a liquid product filtrate; and centrifuging the liquid product filtrate to separate silicalite particles from the liquid product filtrate.

23. The process as set forth in claim 15 wherein the silicalite particles are calcined after drying.

24. The process as set forth in claim 15 wherein the alkylonium compound is tetrapropylammonium bromide and the base is sodium hydroxide.

25. A process for preparing silicalite particles, the process comprising:

mixing an alkylonium compound, silica source, a base and water in a molar ratio of about 1:2–10:1–4:20–100, respectively, to form a gel;

aging the gel in a sealed container;

heating the aged gel and reacting the silica and alkylonium compound in the heated gel to form a reaction mixture comprising silicalite particles having a diameter from about 0.1 micrometers to about 0.5 micrometers;

diluting the reaction mixture with water to form a liquid product mixture;

transmitting ultrasonic waves through the liquid product mixture to disperse the silicalite particles in the liquid product mixture;

recovering the silicalite particles from the liquid product mixture; and drying the silicalite particles.

26. The process as set forth in claim 25 wherein the aged gel is heated to a temperature of from about 80° C. to about 180° C.

27. The process as set forth in claim 26 wherein the aged gel is heated for a reaction period of from about 12 hours to about 72 hours.

28. The process as set forth in claim 25 wherein the reaction mixture comprises silicalite particles having a diameter of from about 0.1 micrometers to about 0.2 micrometers.

29. The process as set forth in claim 28 wherein the alkylonium compound, silica source, base and water are mixed in a molar ratio of about 1.0:4.0:1.2–1.5:40, respectively.

30. The process as set forth in claim 25 wherein the gel is aged for a period of from about 8 to about 10 hours.

31. The process as set forth in claim 25 wherein the alkylonium compound and silica source in the heated gel are reacted for about 48 hours at a temperature of about 100° C.

32. The process as set forth in claim 25 wherein the recovery step comprises:

filtering the liquid product mixture to separate silicalite particles from the liquid product mixture and produce a liquid product filtrate; and centrifuging the liquid product filtrate to separate silicalite particles from the liquid product filtrate.

33. The process as set forth in claim 25 wherein the silicalite particles are calcined after drying.

34. The process as set forth in claim 25 wherein the alkylonium compound is tetrapropylammonium bromide and the base is sodium hydroxide.

35. The process as set forth in claim 25 wherein ultrasonic waves are transmitted through the liquid product mixture for a period of from about 2 hours to about 48 hours.

36. The process as set forth in claim 35 wherein the ultrasonic waves are transmitted through the liquid product mixture for a period of from about 4 to about 12 hours.

37. The process as set forth in claim 25 wherein the ultrasonic waves are transmitted through the liquid product mixture at a frequency of about 42 kHz.

* * * * *